(12) United States Patent
Kilgore

(10) Patent No.: US 6,748,964 B2
(45) Date of Patent: Jun. 15, 2004

(54) FLOW-THROUGH PRESSURE REGULATOR SELF-CONTAINED VALVE ASSEMBLY

(75) Inventor: Jason T. Kilgore, Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/920,623

(22) Filed: Aug. 3, 2001

(65) Prior Publication Data

US 2003/0024573 A1 Feb. 6, 2003

(51) Int. Cl.[7] .............................................. G05D 16/06
(52) U.S. Cl. ......................... 137/14; 123/457; 137/508; 137/510
(58) Field of Search .................. 137/508, 510, 137/14; 123/457, 459, 460

(56) References Cited

U.S. PATENT DOCUMENTS

| | | | |
|---|---|---|---|
| 1,443,183 A | * | 1/1923 | Kings ......................... 123/459 |
| 3,258,029 A | | 6/1966 | Parrino |
| 4,370,102 A | | 1/1983 | Sasaki et al. ................ 137/510 |
| 4,431,026 A | | 2/1984 | Fehrenbach et al. ......... 137/510 |
| 4,627,463 A | | 12/1986 | Johnstone .................... 137/510 |
| 4,741,360 A | | 5/1988 | Affeldt et al. ............... 137/510 |
| 5,220,941 A | | 6/1993 | Tuckey ........................ 137/510 |
| 5,265,644 A | | 11/1993 | Tuckey ........................ 137/510 |
| 5,413,077 A | | 5/1995 | Hornby et al. ............... 123/457 |
| 5,421,306 A | * | 6/1995 | Talaski ........................ 123/510 |
| 5,435,344 A | | 7/1995 | Robinson et al. ........... 137/508 |
| 5,435,345 A | | 7/1995 | Robinson et al. ........... 137/508 |
| 5,509,444 A | | 4/1996 | Robinson et al. ........... 137/508 |
| 5,901,742 A | | 5/1999 | Kleppner et al. ............ 137/508 |
| 6,068,014 A | | 5/2000 | Tomita ......................... 137/508 |

* cited by examiner

Primary Examiner—Stephen M. Hepperle

(57) ABSTRACT

The present invention provides a flow-through pressure regulator which is self-contained. The flow-through pressure regulator includes a housing having an inlet and an outlet offset along an axis. The housing is separated by a valve assembly into a first chamber and a second chamber. The valve assembly is disposed between the inlet and the outlet along the axis. The valve assembly has a closure member that permits or inhibits flow.

23 Claims, 1 Drawing Sheet

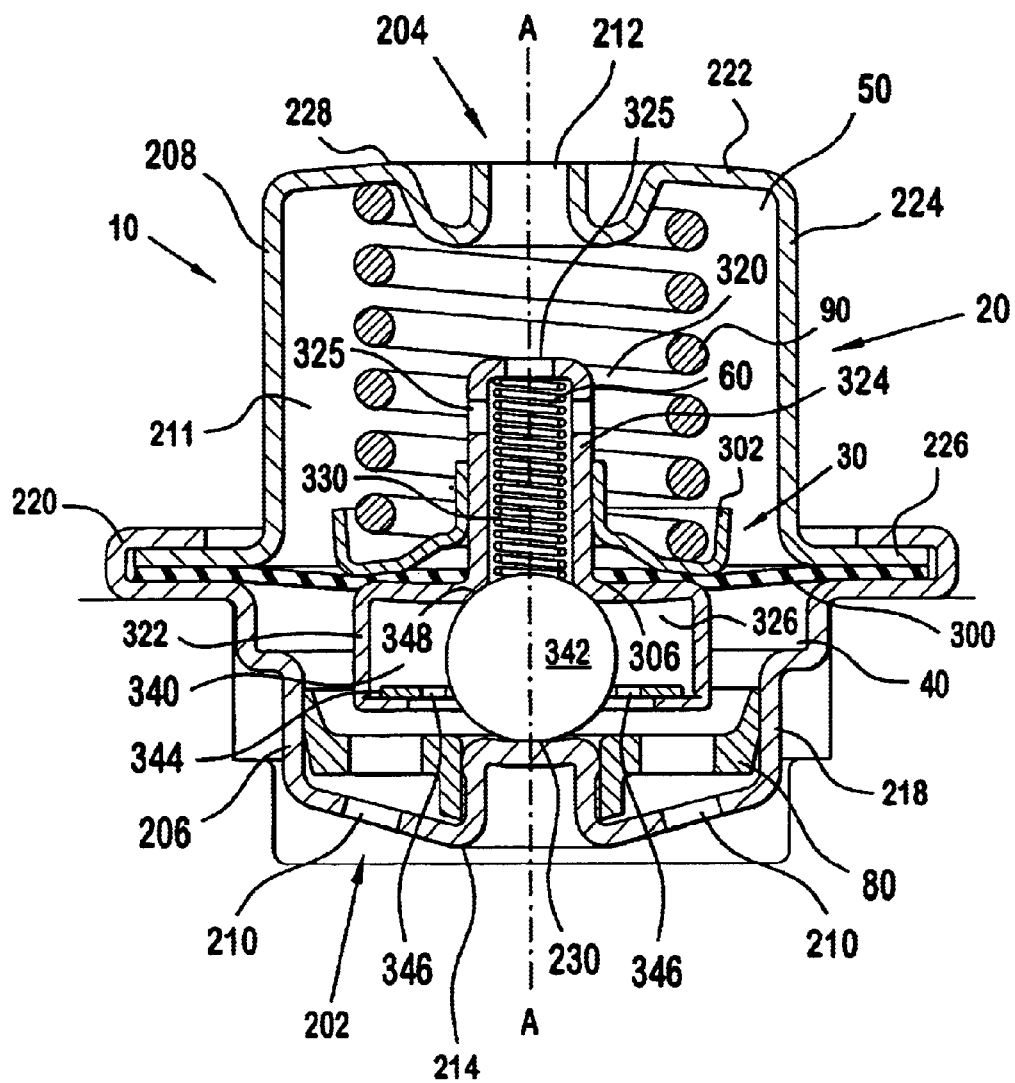

FLOW-THROUGH PRESSURE REGULATOR SELF-CONTAINED VALVE ASSEMBLY

FIELD OF THE INVENTION

This invention relates to a fuel pressure regulator in general, and more particularly to a flow-through fuel pressure regulator that is self-contained, which reduces the number of components required by prior pressure control devices.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators which control the pressure of the fuel in the system at all engine r.p.m. levels.

It is believed that some existing pressure regulators employ a spring biased valve seat with a longitudinal flow passage. The valve seat is biased to a closed position against a valve closure member to prevent the flow of fuel through the pressure regulator at low fuel pressures. As fuel pressure builds in the system, the pressure against the valve seat overcomes the biasing force of the spring, allowing fuel to flow through the valve seat, thereby controlling the fuel pressure in the system.

In this type of pressure regulator, the valve seat and valve member were distinct components with various parts. The components are located at different positions within the housing of the pressure regulator and provide a valve assembly with distributed operative parts. These parts are believed to require detailed machining to fabricate. Thus, it is believed that a flow-through pressure regulator is needed that has a valve assembly that can be fabricated with fewer machined components, as well as with fewer components overall and that is configured within the pressure regulator so that the components are contained with a single operative part, i.e. self-contained.

SUMMARY OF THE INVENTION

The present invention provides a flow-through pressure regulator which is self-contained. The flow-through pressure regulator includes a housing having an inlet and an outlet offset along an axis. The housing is separated by a valve assembly into a first chamber and a second chamber. The valve assembly has a closure member, the valve assembly being located in a first position that inhibits flow between the first chamber and the second chamber. The valve assembly can also be located in a second position that permits flow between the first chamber and the second chamber through the valve assembly. The valve assembly is disposed between the inlet and the outlet along the axis.

The present invention also provides a method of regulating fuel pressure in a fuel conduit. The flow-through regulator includes a housing with an inlet and an outlet along an axis. The method is achieved by disposing a valve assembly in a fluid flow path between the valve assembly which separates the housing into a first chamber and a second chamber, providing the valve assembly with a closure member that permits or inhibits flow, occluding flow in a first position of the valve assembly at a first pressure, and permitting flow in a second position of the valve assembly at a second pressure.

The present invention also provides a method of assembling a flow-through pressure regulator. The method of assembly includes providing a first cup-shaped member and a second cup-shaped member. The first cup-shaped member has a first base, a first lateral wall extending in a first lateral direction along an axis from the first base, and a first flange extending from the first lateral wall in a direction substantially transverse to the axis. The second cup-shaped member has a second base, a second lateral wall extending in a second direction along the axis from the second base, and a second flange extending from the second lateral wall in a direction substantially transverse to the axis. A valve assembly having a closure member is disposed between the first and second cup-shaped members. First and second chambers are formed by securing the valve assembly to the first and second cup-shaped members. The first and second cup-shaped members are coupled, which forms a unitary housing.

BRIEF DESCRIPTION OF THE DRAWINGS

The accompanying drawings, which are incorporated herein and constitute part of this specification, illustrate presently preferred embodiments of the invention, and together with the general description given above and the detailed description given below, serve to explain the features of the invention.

The FIGURE illustrates a flow-through regulator according to a preferred embodiment of the invention.

DETAILED DESCRIPTION OF THE PREFERRED EMBODIMENT

The FIGURE illustrates a flow-through pressure regulator 10 according to a preferred embodiment. The flow-through pressure regulator 10 includes a housing 20. The housing 20 is separated by a valve assembly 30 into a first chamber 40 and a second chamber 50. The valve assembly 30 has a passage 60 that communicates the first chamber 40 with the second chamber 50. The valve assembly 30 permits or inhibits flow through the passage 60. A filter 80 is disposed in the flow path of the housing 20. The housing 20 has an inlet 202 and an outlet 204 offset along a longitudinal axis A. The housing 20 can include a first cup-shaped member 206 and a second cup-shaped member 208 that are crimped together to form a unitary housing 20 with a hollow interior 211. Although the unitary housing 20 is formed by two joined members, it is to be understood that the unitary housing could be formed with multiple members integrated together, or alternatively, a monolithic member. Furthermore, while the preferred embodiment of the housing 20 includes cup-shaped members, the housing 20 can include other geometries as well, such as tubular-shaped members. The inlet 202 of the housing 20 is located in the first cup-shaped member 206, and the outlet 204 of the housing 20 is located in the second cup-shaped member 208. The inlet 202 can be a plurality of inlet apertures 210 located in the first cup-shaped member 206. The outlet 204 can be a port 212 disposed in the second cup-shaped member 208.

The first cup-shaped member 206 can include a first base 214, a first lateral wall 218 extending in a first direction along the longitudinal axis A from the first base 214, and a first flange 220 extending from the first lateral wall 218 in a direction substantially transverse to the longitudinal axis A. The second cup-shaped member 208 can include a second base 222, a second lateral wall 224 extending in a second direction along the longitudinal axis A from the second base 222, and a second flange 226 extending from the second lateral wall 224 in a direction substantially transverse to the longitudinal axis A. The valve assembly 30 includes a flexible divider 300, which can be a diaphragm. The divider 300 is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

In addition to the divider 300, the valve assembly 30 includes a tubular member 320 and a closure member 340. The tubular member 320 is located in a central aperture 306 of the divider 300 to provide the passage 60. The tubular member 320 includes a first tubular portion 322 and a second tubular portion 324. The first tubular portion 322 is disposed entirely within the first chamber 40 and has a diameter disposed along the axis. An upper surface of the first tubular portion 322 extends substantially transverse to the longitudinal axis A and contacts a lower operative surface of the divider 300. The first tubular portion 322 forms a chamber 326 housing the closure member 340. The second tubular portion 324 is disposed substantially within the second chamber 50 and has a diameter disposed along the axis. The diameter of the second tubular portion 324 is smaller than the diameter of the first tubular portion 322. An outer surface of the second tubular portion 324 is secured to a spring retainer 302 preferably by an interference fit. The outer surface of the second tubular portion 324, however, may be secured to the spring retainer 302 by staking or crimping. A lower end of the second tubular portion 324 extends beyond the divider 300 into the first chamber 40 and forms a unitary tubular junction 348 with an upper end of the first tubular portion 322. The second tubular portion 324 includes a plurality of tubular apertures 325 located in an end proximate the outlet 204 to provide a flow path through the passage 60.

The closure member 340 includes a ball 342 retained in a ball retainer 344. The ball retainer 344 is disposed in the chamber 326 housing the closure member 340 and can be a flat annulus secured within chamber 326 by a flange provided at the lower end of the first tubular portion 322. The flange of the lower end of the first tubular portion 322 allows for the ball retainer to move within the chamber 326. This can be achieved by providing an aperture in the ball retainer 344 with an outside diameter which is smaller than an inner diameter of the first tubular portion 322. The difference in diameters allows the ball retainer to move freely in both axially and radially within the chamber 326. The ball retainer 344 has a central aperture and a plurality of retainer apertures 346 located along a circumference of the ball retainer 344. The central aperture of the ball retainer 344 is somewhat smaller than the diameter of the ball 342 and is finished to prevent a rough surface from contacting the ball 342. The plurality of retainer apertures 346 in the ball retainer 344 permit flow through the first tubular portion 322. An upper surface of the ball 342 seats on the tubular junction 348. A lower surface of the ball 342 seats on a seating surface 230 formed in a center portion of the first base 214 along the longitudinal axis A and opposite the tubular junction 348.

A first biasing element 330, which can be a spring, is disposed within an inner diameter of the second tubular portion 324, substantially within the second chamber 50. An outer surface of the first biasing element 330 contacts an inner diameter of the second tubular portion 324. The first biasing element 330 extends along the length of the second tubular portion 324. An upper end of the first biasing element 330 engages the end of the second tubular portion 324 proximate the outlet 204, while a lower end of the first biasing element 330 contacts the upper surface of the ball 342. The first biasing element 330 biases the ball 342 at a predetermined force toward the base 214.

A second biasing element 90, which can be a spring, is disposed entirely within the second chamber 50 and is concentric with the first biasing element 330. The second biasing element 90 engages a locator 228 on the base 222 of the second cup-shaped member 208 and biases the valve assembly 30 toward the base 214 of the first cup-shaped member 206. The second biasing element 90 biases the valve assembly 30 at a predetermined force, which relates to the pressure desired for the regulator 10. The base 222 of the second cup-shaped member 208 has a dimpled center portion that provides the outlet portion 212 in addition to the locator 228. A first end of the second biasing element 90 is secured on the locator 228, while a second end of the second biasing element 90 can be supported by the spring retainer 302.

The operation of the flow-through pressure regulator 10 will now be described. The second biasing element 90 acts through the spring retainer 302 to bias the divider 300, and hence the valve assembly 70, toward the base 214 of the first cup-shaped member 206. The first biasing element 330 biases the ball 342 of the closure member 340, against the seating surface 230 in the base 214 of the first cup-shaped member 206. When the ball 342 is seated against the tubular junction 348, the valve assembly 70 is in a closed position, and no fuel can pass through the regulator 10.

Fuel enters the regulator 10 through inlet apertures 210 and exerts pressure on the valve assembly 70, including the divider 300. When the pressure of the fuel is greater than the force exerted by the second biasing element 90, the valve assembly 70 is displaced along the longitudinal axis A toward the outlet 204. The force exerted by the first biasing element 330 unseats the ball 342 from the tubular junction 348 creating a pathway for the fuel. Fuel enters the first tubular portion 322 around the ball 342 and through the plurality of retainer apertures 346 located in the ball retainer 344. The fuel enters the passage 60 through the gap created by the unseated ball 342 and exits the passage 60 along and transverse to the longitudinal axis A through the plurality of tubular apertures 325 located in the end of the second tubular portion 324 proximate the outlet 204.

As the fuel pressure is reduced, the force of the second biasing element 90 overcomes the fuel pressure and returns the tubular junction 348 to seated engagement with the ball 342, thus closing the passage 60. Operating in this manner, the regulator 10 is able to maintain constant fuel pressure in a fuel system.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A flow-through pressure regulator, comprising:
   a housing having an inlet and an outlet offset with respect to each other along an axis extending through one of the inlet and outlet; and
   a valve assembly having a closure member, the valve assembly being coupled to a divider disposed between the inlet and the outlet along the axis to separate the housing into a first chamber and a second chamber, the valve assembly being positioned in a first position that inhibits flow between the first chamber and the second chamber, and the valve assembly carrying a portion of the closure member in a second position that permits flow between the first chamber and the second chamber through the valve assembly, the valve assembly including a tubular member extending along the axis, the tubular member having a wall of a generally constant thickness along the axis, the tubular member including a seating surface to receive a spring member, the seating surface being located along the axis between the divider and the outlet.

2. A flow-through pressure regulator comprising:

a housing having an inlet and an outlet offset with respect to each other along an axis extending through one of the inlet and outlet; and a valve assembly having a closure member, the valve assembly being disposed between the inlet and the outlet along the axis and separating the housing into a first chamber and a second chamber, the valve assembly being positioned in a first position that inhibits flow between the first chamber and the second chamber, and the valve assembly carrying a portion of the closure member in a second position that permits flow between the first chamber and the second chamber through the valve assembly, wherein the valve assembly comprises a flexible divider having a first operative surface and a second operative surface, the first operative surface being exposed to the first chamber, the second operative surface being exposed to the second chamber, a tubular member coupled to the first surface and the second surface, the tubular member having a passage along the axis that communicates the first chamber with the second chamber, when the valve assembly is in the second position, the tubular member extending along the axis, the tubular member having a wall of a generally constant thickness along the axis, the tubular member including a seating surface to receive a string member, the seating surface being located along the axis between the divider and the outlet.

3. The flow-through pressure regulator of claim 2, wherein the tubular member comprises a first tubular portion and a second tubular portion, the first tubular portion having a major diameter disposed about the axis and the second tubular portion having a minor diameter disposed about the axis.

4. The flow-through pressure regulator of claim 3, wherein the first tubular portion is disposed in the first chamber and the second tubular portion is disposed substantially in the second chamber.

5. The flow-through pressure regulator of claim 4, wherein a lower end of the second tubular portion extends from the second chamber, through the divider and into the first chamber, the lower end of the second tubular portion and an upper end of the first tubular portion forming a tubular junction.

6. The flow-through pressure regulator of claim 5, wherein a first biasing element, disposed within the second tubular portion, biases the closure member toward the inlet, and a second biasing element, disposed in the second chamber and concentric with the first biasing element, biases the valve assembly toward the inlet.

7. The flow-through pressure regulator of claim 6, wherein an outer surface of the second tubular portion is secured by interference to a retaining element.

8. The flow-through pressure regulator of claim 7, wherein the valve seat comprises a first surface disposed along the axis in the first chamber and a second surface disposed along the axis in the first chamber.

9. The flow-through pressure regulator of claim 8, wherein the first surface of the valve seat includes the tubular junction and the second surface of the valve seat includes a portion of the housing.

10. The flow-through pressure regulator of claim 9, wherein the closure member comprises a spherical portion disposed in a retainer, the retainer being coupled to the first tubular portion.

11. The flow-through regulator of claim 10, wherein the housing comprises a first cup-shaped member and a second cup-shaped member, the first cup-shaped member having a first base, a first lateral wall extending in a first direction along the axis from the first base, and a first flange extending from the first lateral wall in a direction substantially transverse to the axis, the second cup-shaped member having a second base, a second lateral wall extending in a second direction along the axis from the second base, and a second flange extending from the second lateral wall in a direction substantially transverse to the axis, the first flange and the second flange being secured together to provide a unitary housing.

12. A flow-through regulator comprising:

a housing having a longitudinal axis with at least one of an inlet and an outlet offset along the axis, the housing includes a first cup-shaped member and a second cup-shaped member, the first cup-shaped member having a first base, a first lateral wall extending in a first direction along the axis from the first base, and a first flange extending from the first lateral wall in a direction substantially transverse to the axis, the second cup-shaped member having a second base, a second lateral wall extending in a second direction along the axis from the second base, and a second flange extending from the second lateral wall in a direction substantially transverse to the axis, the first flange and the second flange being secured together to provide a unitary housing;

a valve assembly having a closure member, the valve assembly being disposed between the inlet and the outlet along the axis and separating the housing into a first chamber and a second chamber, the valve assembly being positioned in a first position that inhibits flow between the first chamber and the second chamber, and the valve assembly carrying a portion of the closure member in a second position that permits flow between the first chamber and the second chamber through the valve assembly, the closure member including a spherical portion disposed in a retainer, the retainer being coupled to the first tubular portion wherein the valve assembly comprises a flexible divider having a first operative surface and a second operative surface, the first operative surface being exposed to the first chamber, the second operative surface being exposed to the second chamber, a tubular member coupled to the first surface and the second surface, the tubular member having a passage along the axis that communicates the first chamber with the second chamber, when the valve assembly is in the second position, the tubular member comprises a first tubular portion and a second tubular portion, the first tubular portion having a major diameter disposed about the axis and the second tubular portion having a minor diameter disposed about the axis, and the first tubular portion is disposed in the first chamber and the second tubular portion is disposed substantially in the second chamber, a lower end of the second tubular portion extends from the second chamber, through the divider and into the first chamber, the lower end of the second tubular portion and an upper end of the first tubular portion forming a tubular junction, a first biasing element, disposed within the second tubular portion, biases the closure member toward the inlet, and a second biasing element, disposed in the second chamber and concentric with the first biasing element, biases the valve assembly toward the inlet, an outer surface of the second tubular portion is secured by interference to a retaining element, the valve seat comprises a first surface disposed along the axis in the first chamber and a second surface disposed along the axis in the first chamber, the first surface of the valve seat includes the tubular junction and the second surface of the valve seat includes a portion of the housing, and the second surface of the valve seat includes a portion of the first base having a configuration complementary to the closure member.

13. The flow-through regulator of claim 12, wherein the valve assembly is secured between the first flange and the second flange.

14. A method of regulating fuel pressure in a fuel conduit, wherein a flow-through regulator having an inlet and an outlet offset with respect to each other along an axis extending through one of the inlet and outlet, the method comprising:

disposing a valve assembly having a closure member in a fluid flow communication path between the inlet and the outlet, the valve assembly defining the communication path between the inlet and the outlet such that the inlet is offset relative to the outlet with respect to the axis of the flow-through regulator;

occluding flow between the inlet and the outlet through the communication path of the valve assembly with the closure member, the valve assembly being located by a divider in a first position at a first pressure, the valve assembly including a tubular member extending along the axis, the tubular member extending along the axis, the tubular member having a wall of a generally constant thickness along the axis, the tubular member including a seating surface for a spring member and a seating surface to receive a spring member, the seating surface being located along the axis between the divider and the outlet; and permitting flow between the inlet and the outlet through the communication path of the valve assembly, the valve assembly carrying a portion of the closure member in a second position at a second pressure.

15. A method of regulating fuel pressure in a fuel conduit, wherein a flow-through regulator having an inlet and an outlet offset with respect to each other along an axis extending through one of the inlet and outlet, the method comprising:

disposing a valve assembly having a closure member in a fluid flow path between the inlet and the outlet, the valve assembly defining the communication path between the inlet and the outlet;

occluding flow between the inlet and the outlet through the communication path of the valve assembly with the closure member, the valve assembly being in a first position at a first pressure;

permitting flow between the inlet and the outlet through the communication path of the valve assembly, the valve assembly carrying a portion of the closure member in a second position at a second pressure; providing the valve assembly with a flexible divider, the divider being substantially transverse to the axis;

providing the divider with a first operative surface and a second operative surface;

suspending a tubular member by the divider;

providing the tubular member with a passage along the axis that communicates the first chamber with the second chamber, the tubular member extending along the axis, the tubular member having a wall of a generally constant thickness along the axis, the tubular member including a seating surface for a spring member, the seating surface located along the axis between the divider and the outlet; and providing the valve assembly with a valve seat.

16. The method of claim 15, wherein the tubular member comprises a first tubular portion and a second tubular portion, the first tubular portion having a major diameter disposed about the axis and the second tubular portion having a minor diameter disposed about the axis.

17. The method of claim 16, further comprising:

disposing the first tubular portion entirely in the first chamber;

disposing the second tubular portion substantially in the second chamber, a lower end of the second tubular portion extending past the divider;

forming a tubular junction with the lower end of the second tubular portion and an upper end of the first tubular portion;

disposing a first biasing element within the second tubular portion, the first biasing element biasing the closure member toward the inlet; and disposing a second biasing element in the second chamber and concentric with the first biasing element, the second biasing element biasing the valve assembly toward the inlet.

18. The method of claim 17, wherein the valve seat comprises a first surface disposed along the axis in the first chamber and the second surface disposed along the axis in the first chamber, the first surface including the tubular junction and the second surface including a portion of the housing adapted to support a surface of the closure member.

19. The method of claim 18, further comprising:

disposing a spherical portion of the closure member in a retainer; and coupling the retainer to the first tubular portion.

20. The method of claim 19, wherein the housing comprises a first cup-shaped member and a second cup-shaped member, the first cup-shaped member having a first base, a first lateral wall extending in a first direction along the axis from the first base, and a first flange extending from the first lateral wall in a direction substantially transverse to the axis, the second cup-shaped member having a second base, a second lateral wall extending in a second direction along the axis from the second base, and a second flange extending from the second lateral wall in a direction substantially transverse to the axis, the first flange and the second flange being secured together to provide a unitary housing.

21. A method of assembling a flow-through fuel pressure regulator, the method comprising:

providing a first cup-shaped member and a second cup-shaped member, the first cup-shaped member having a first base, a first lateral wall extending in a first direction along an axis from the first base, and a first flange extending from the first lateral wall in a direction substantially transverse to the axis, the second cup-shaped member having a second base, a second lateral wall extending in a second direction along the axis from the second base, and a second flange extending from the second lateral wall in a direction substantially transverse to the axis, the first flange and the second flange being secured together to provide a unitary housing;

disposing a valve assembly having a closure member between the first cup-shaped member and the second cup-shaped member, the valve assembly including a first portion housing the closure member so that the closure member is carried by the first portion when the valve assembly is moved;

securing a second portion of the valve assembly to the first cup-shaped member and the second cup-shaped member via a divider, thereby forming a first chamber and a second chamber with the seating surface located along the axis between the divider and the outlet, the first and second portions extending along the axis, the portions having a wall of a generally constant thickness along the axis, the second portion including a seating surface to receive a spring member; and coupling the first cup-shaped member and the second cup-shaped member, thereby forming a unitary housing.

22. The flow-through pressure regulator of claim 2, wherein the closure member comprises an aperture offset along the axis that permits flow between the first chamber and the first tubular portion.

23. The flow-through pressure regulator of claim 10, wherein an outer diameter of the retainer is smaller than an inner diameter of the first tubular portion to permit the retainer to move within the first tubular portion.

* * * * *